(12) United States Patent
Tanase et al.

(10) Patent No.: US 7,575,220 B2
(45) Date of Patent: Aug. 18, 2009

(54) CURVED SLIT VALVE DOOR

(75) Inventors: Yoshiaki Tanase, San Jose, CA (US); Billy C. Leung, Sunnyvale, CA (US); Gregory S. Lewis, Mountain View, CA (US); David E. Berkstresser, Los Gatos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 588 days.

(21) Appl. No.: 10/867,100

(22) Filed: Jun. 14, 2004

(65) Prior Publication Data
US 2005/0274923 A1  Dec. 15, 2005

(51) Int. Cl.
*F16K 25/00* (2006.01)
(52) U.S. Cl. ............... 251/177; 251/303; 251/334; 49/40; 414/221
(58) Field of Classification Search ............. 251/177, 251/301, 303, 334, 176, 192, 193, 333; 49/40, 49/41; 414/221
See application file for complete search history.

(56) References Cited

U.S. PATENT DOCUMENTS

| | | | | |
|---|---|---|---|---|
| 3,090,593 A | * | 5/1963 | Pro | 251/87 |
| 3,557,837 A | * | 1/1971 | Giwosky | 137/630.14 |
| 3,995,563 A | * | 12/1976 | Blunden | 105/378 |
| 4,128,120 A | * | 12/1978 | Frey | 160/191 |
| 4,698,940 A | * | 10/1987 | Zwicker | 451/101 |
| 5,793,050 A | * | 8/1998 | Rose et al. | 250/492.21 |
| 6,089,543 A | * | 7/2000 | Freerks | 251/357 |
| 6,192,827 B1 | | 2/2001 | Welch et al. | |
| 6,250,869 B1 | * | 6/2001 | Kroeker | 414/221 |

FOREIGN PATENT DOCUMENTS

WO        WO 00/02228        1/2000

OTHER PUBLICATIONS

Kurita, et al., "Load Lock Chamber for Large Area Substrate Processing System," U.S. Appl. No. 10/832,795, filed Apr. 26, 2004.

* cited by examiner

*Primary Examiner*—John K Fristoe, Jr.
(74) *Attorney, Agent, or Firm*—Patterson & Sheridan, LLP

(57) ABSTRACT

Embodiments of an apparatus for sealing a substrate transfer passage in a chamber are provided. In one embodiment, an apparatus for sealing a substrate transfer passage in a chamber includes an elongated door member having a convex sealing face and a backside. In another embodiment, a chamber having an apparatus for sealing a substrate transfer passage is provided that includes a chamber body having an interior volume, at least one substrate access defined through the chamber body configured to allow passage of a large area substrate therethrough, and a door member having a convex sealing face moveable between a first position that covers the substrate transfer port and a second position clear of the substrate transfer port. In yet another embodiment, the chamber body may be a load lock chamber.

34 Claims, 9 Drawing Sheets

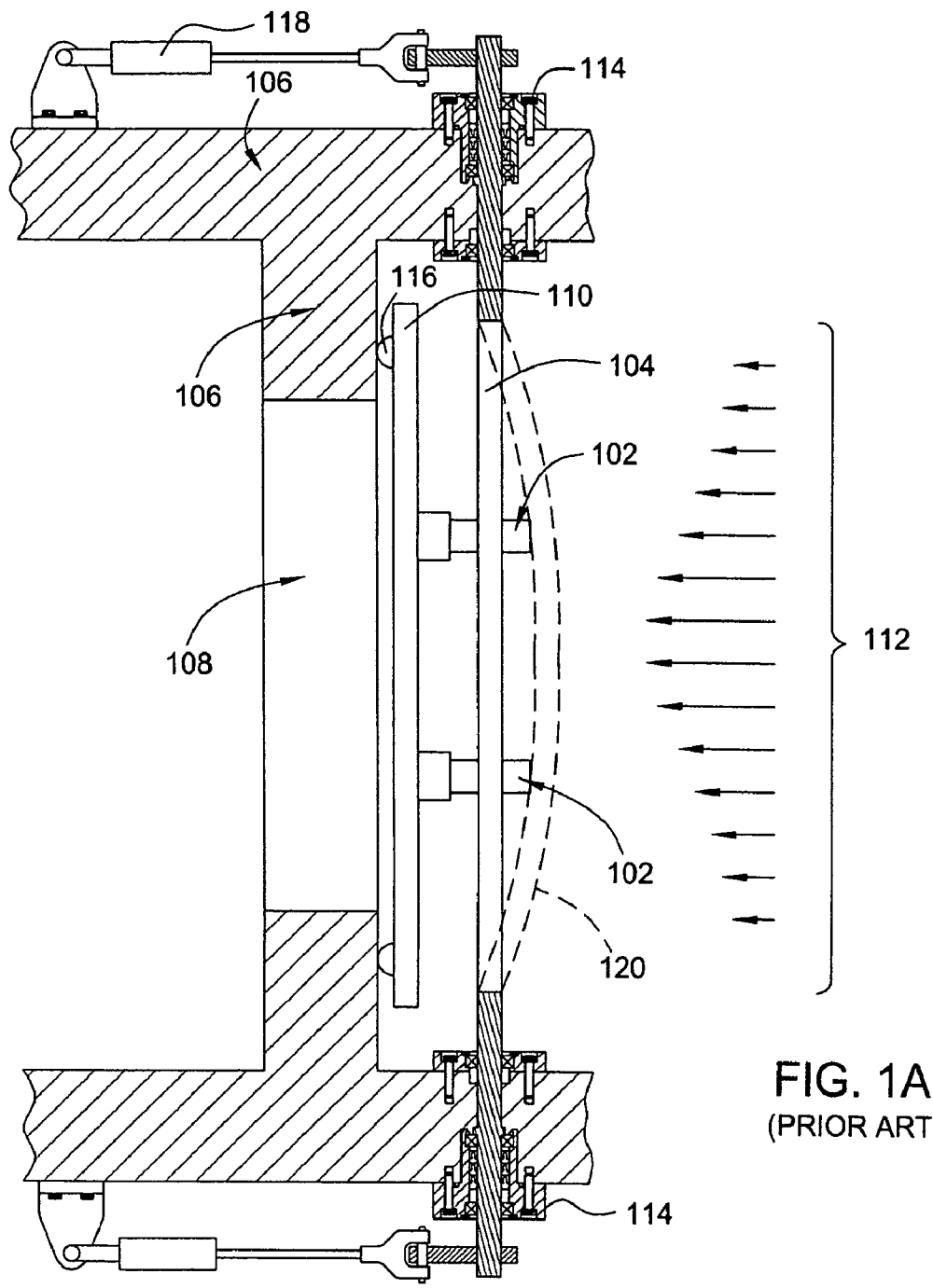
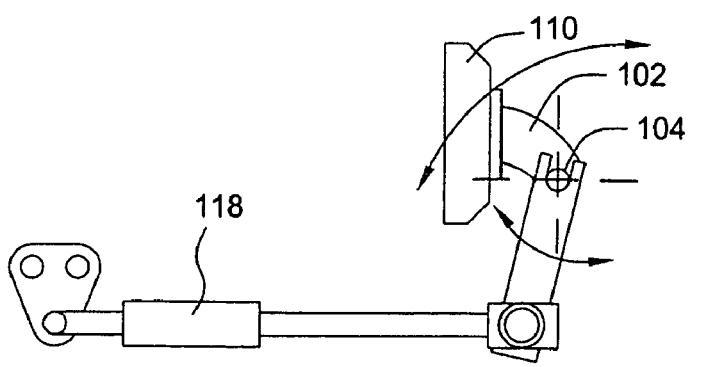
FIG. 1A (PRIOR ART)
FIG. 1B (PRIOR ART)

CURVED SLIT VALVE DOOR

BACKGROUND OF THE INVENTION

1. Field of the Invention

The embodiments of the invention generally relate to a slit valve door for sealing substrate passages in vacuum processing systems.

2. Background of the Related Art

Thin film transistors (TFT) are commonly used for active matrix displays such as computer and television monitors, cell phone displays, personal digital assistants (PDAs), and an increasing number of other devices. Generally, flat panels comprise two glass plates having a layer of liquid crystal materials sandwiched therebetween. At least one of the glass plates includes one conductive film disposed thereon that is coupled to a power source. Power, supplied to the conductive film from the power source, changes the orientation of the crystal material, creating a pattern display.

With the marketplace's acceptance of flat panel technology, the demand for larger displays, increased production and lower manufacturing costs have driven equipment manufacturers to develop new systems that accommodate larger size glass substrates for flat panel display fabricators. Current glass processing equipment is generally configured to accommodate substrates up to about one square meter. Processing equipment configured to accommodate substrate sizes up to and exceeding four square meters is envisioned in the immediate future.

Glass substrate processing is typically performed in a cluster tool by subjecting a substrate to a plurality of sequential processes to create devices, conductors, and insulators on the substrate. Each of these processes is generally performed in a process chamber configured to perform a single step of the production process. In order to efficiently complete the entire sequence of processing steps, the cluster tool includes a number of process chambers coupled to a central transfer chamber. A robot is housed in the transfer chamber to facilitate transfer of the substrate between the process chambers and a load lock chamber. The load lock chamber allows substrates to be transferred between the vacuum environment of the cluster tool and an ambient environment of a factory interface. Such cluster tools for glass substrate processing are available from AKT, Inc., a wholly-owned subsidiary of Applied Materials, Inc., of Santa Clara, Calif.

As the substrate size for manufacturing flat panel display grows, the manufacturing equipment for these substrates becomes larger in size as well. Accordingly, the door or gate that isolates one vacuum chamber (or load lock) from another has become larger, or, specifically longer since the slit opening between the two chambers has to become wider to accommodate the large width of the substrate passing through the slot opening. The increasing length of the door poses a technical challenge for obtaining a good isolation seal between the two chambers, which is maintained by an elastomer seal disposed around the slot opening between the door and a chamber wall.

FIG. 1A depicts a partial sectional view of a substrate passage 108 formed through a chamber body 106 and selectively sealed by a conventional slit valve door 110. Conventional slit valve doors are typically comprised of a flat member of aluminum having a long lateral span. A closing force is applied toward the center of the door 110 by brackets 102 attached, as shown in FIGS. 1A-B, to a stiff rotating shaft 104. The door 110 is rotated between a position sealing the passage 108 (as shown in FIG. 1A) and a position clear of the passage 108 by an actuator 118 coupled to the shaft 104. A seal 116 is disposed between the door 110 and chamber body 106.

The force required to load the seal 116 in order to obtain good chamber isolation is high. The high load applied near the center of the door 110 results in a high loading force approximate the center of the door 110 and a substantially lower sealing force near the ends of the door, as depicted by force arrows 112. The shaft 104 may deflect while under load as shown by the phantom shaft 114, as the door 110 has a long span between its bearing supports 114 disposed in the walls of the chamber body 106 and the brackets 102 coupled to the center of the door 110. Deflection of the shaft 114 while the door 110 is in a closed position further aggravates the low loading condition of the seal at the ends of the door. The low sealing force at the edge of the door may lead to undesirable leakage through the passage 108.

In order to provide a stiffer door for more uniform seal loading, the door and/or the shaft may be fabricated from thicker materials or materials having higher modulus. However, this approach increases the cost of the load lock chamber, as high strength materials are typically expensive, and a larger load lock chamber may be required to accommodate the larger, high strength door with adequate clearance during operation. A larger load lock chamber is undesirable due to the increased material and manufacturing costs of the chamber itself, along with increased pump capacity required to pump down the larger load lock volume. Moreover, increased load lock volume typically requires increased pump time which has an adverse affect on system throughput.

Therefore, there is a need for an improved slit valve door for sealing a substrate transfer passage.

SUMMARY OF THE INVENTION

Embodiments of an apparatus for sealing a substrate transfer passage in a chamber are provided. In one embodiment, an apparatus for sealing a substrate transfer passage in a chamber includes an elongated door member having a concave sealing face and a backside.

In another embodiment, a chamber having an apparatus for sealing a substrate transfer passage is provided that includes a chamber body having an interior volume, at least one substrate transfer port defined through the chamber body configured to allow passage of a large area substrate therethrough, and a door member having a concave sealing face moveable between a first position that covers the substrate transfer port and a second position clear of the substrate transfer port. In yet another embodiment, the chamber body may be a load lock chamber.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

FIG. 1A is a partial sectional view of a chamber body having a substrate passage selectively sealed by a conventional slit valve door;

FIG. 1B is side view, with the chamber body removed, of a door actuator and the conventional slit valve door of FIG. 1A;

It is to be noted, however, that the appended drawings illustrate only typical embodiments of this invention and are therefore not to be considered limiting of its scope, for the invention may admit to other equally effective embodiments.

DETAILED DESCRIPTION

The invention generally provides an improved slit valve door that is particularly suitable for use in large area substrate processing chambers. The invention is illustratively described below as utilized in a flat panel processing system, such as those available from AKT, a division of Applied Materials, Inc., Santa Clara, Calif. However, it should be understood that the invention has utility for sealing substrate transfer passages in other types of processing equipment in other system configurations.

Figure 2:
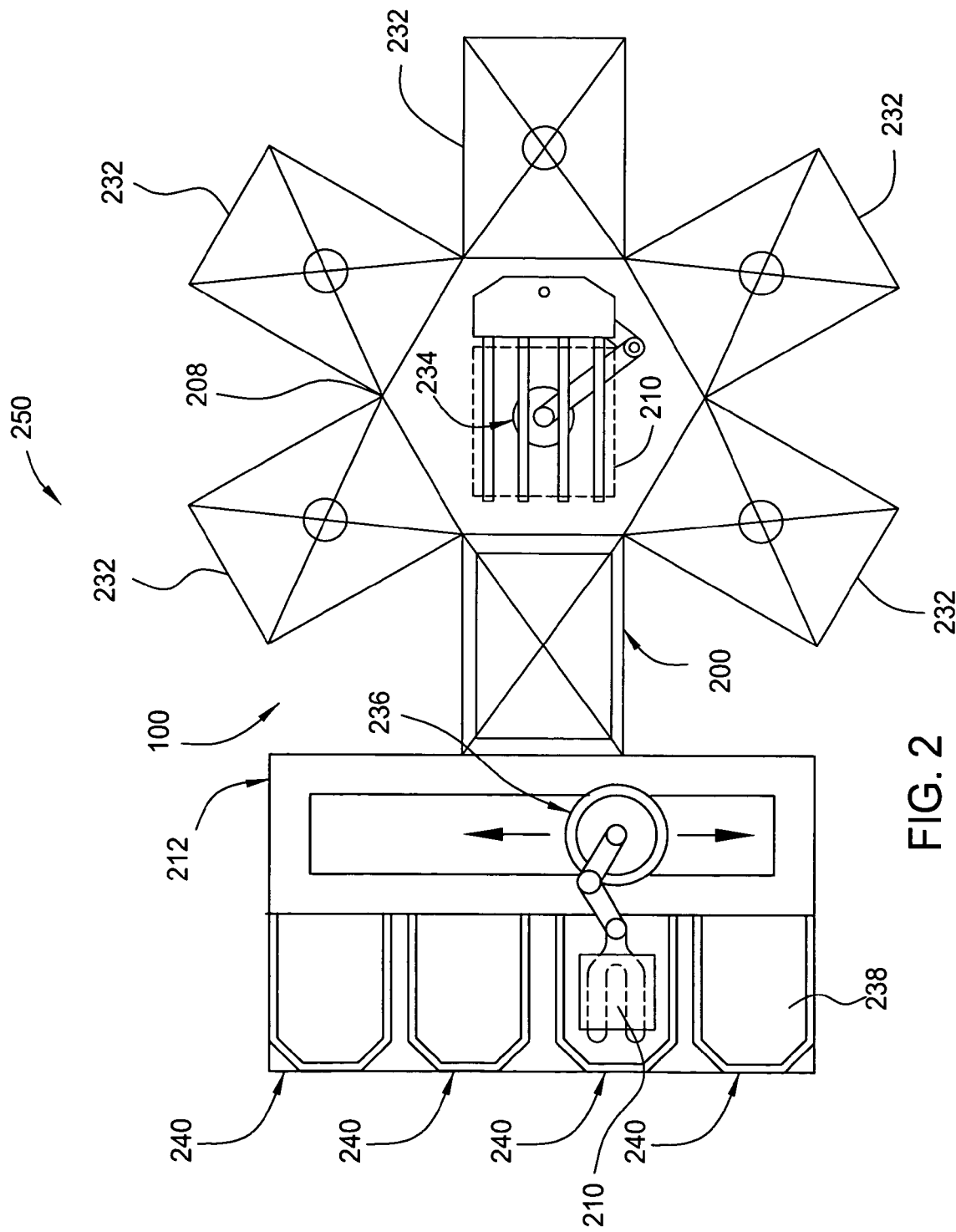
FIG. 2 is a top plan view of one embodiment of a processing system for processing large area substrates having a load lock chamber of the invention.

FIG. 2 is a top plan view of one embodiment of a process system 250 suitable for processing large area substrates (e.g., glass or polymer substrates having a plan area greater than about 0.16 square meters). The process system 250 typically includes a transfer chamber 208 coupled to a factory interface 212 by a load lock chamber 200. The transfer chamber 208 has at least one vacuum robot 234 disposed therein that is adapted to transfer substrates between a plurality of circumscribing process chambers 232 and the load lock chamber 200. Optionally, one of the process chambers 232 may be a pre-heat chamber that thermally conditions substrates prior to processing to enhance throughput of the system 250. Typically, the transfer chamber 208 is maintained at a vacuum condition to eliminate the necessity of adjusting the pressures between the transfer chamber 208 and the individual process chambers 232 after each substrate transfer.

The factory interface 212 generally includes a plurality of substrate storage cassettes 238 and at least one atmospheric robot 236. The cassettes 238 are generally removably disposed in a plurality of bays 240 formed on one side of the factory interface 212. The atmospheric robot 236 is adapted to transfer substrates 210 between the cassettes 238 and the load lock chamber 200. Typically, the factory interface 212 is maintained at or slightly above atmospheric pressure.

Figure 3:
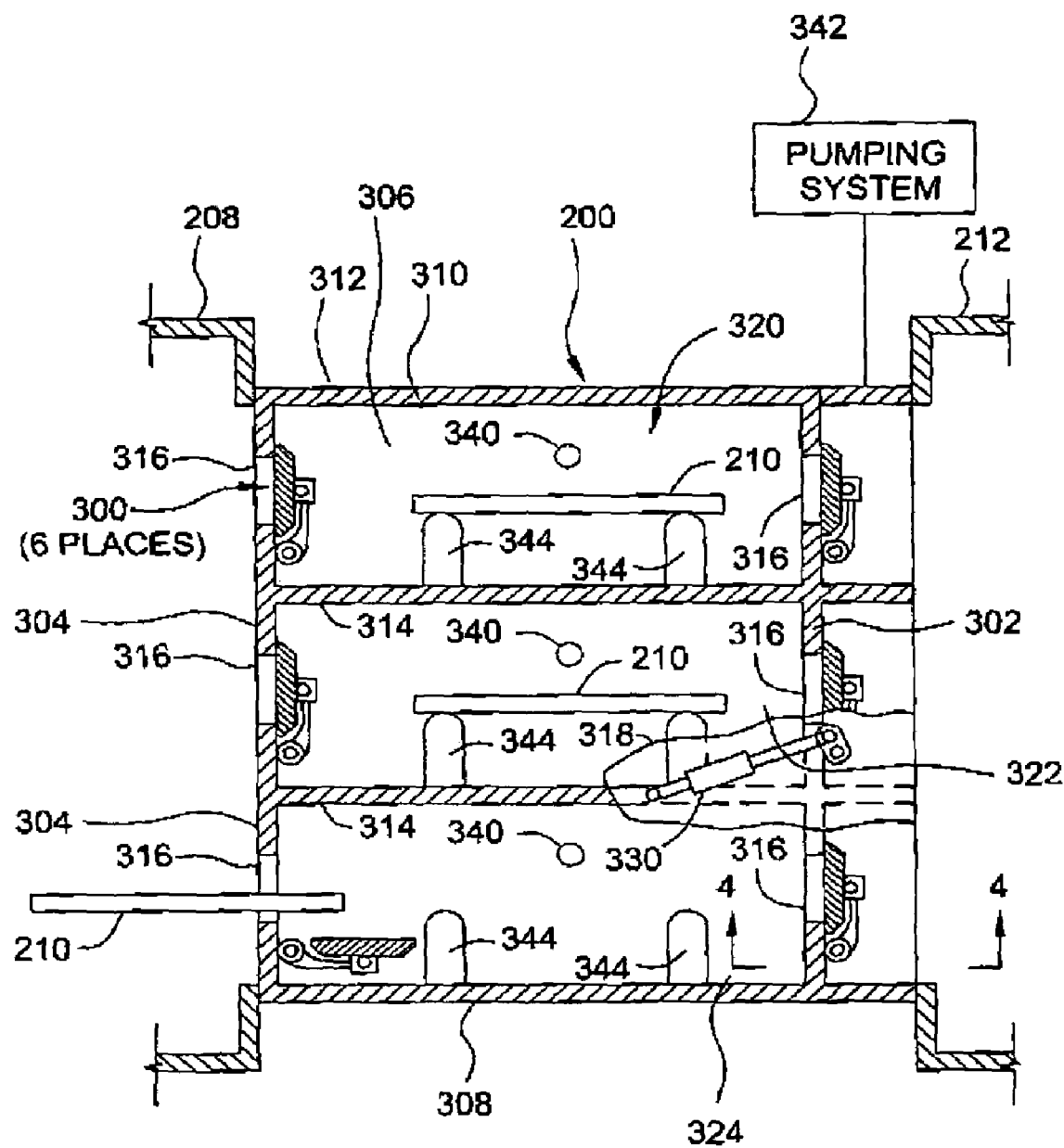
FIG. 3 is a sectional view of the load lock chamber taken along section lines 3-3 of FIG. 2.

FIG. 3 is a sectional view of one embodiment of the load lock 200 of FIG. 2. The load lock chamber 200 includes slit valve door assemblies 300, adapted to seal the passages 316 between the factory interface 212 and the transfer chamber 208. One example of a load lock chamber that may be adapted to benefit from the invention is described in U.S. Provisional Application Ser. No. 60/512,727, entitled "LOAD LOCK CHAMBER FOR LARGE AREA SUBSTRATE PROCESSING SYSTEM", filed Oct. 20, 2003, by Kurita et al., and U.S. patent application Ser. No. 09/464,362, entitled DUAL SUBSTRATE LOADLOCK PROCESS EQUIPMENT, filed Dec. 15, 1999, by Kurita et al., both of which are hereby incorporated by reference in their entireties. It is contemplated that the inventive slit valve door assembly 300 may be utilized with load lock chambers having alternative configurations. It is also contemplated that the slit valve door assembly 300 may also be utilized to selectively seal substrate ports formed in the transfer chamber 208 or processing chambers 232.

In the embodiment depicted in FIG. 3, the load lock chamber 200 has a chamber body 312 that includes a plurality of vertically-stacked, environmentally-isolated substrate transfer chambers that are separated by vacuum-tight, horizontal interior walls 314. Although three single substrate transfer chambers 320, 322, 324 are shown in the embodiment depicted in FIG. 3, it is contemplated that the chamber body 312 of load lock chamber 200 may include two or more vertically-stacked substrate transfer chambers. For example, the load lock chamber 200 may include N substrate transfer chambers separated by N−1 horizontal interior walls 314, where N is an integer greater than one.

The substrate transfer chambers 320, 322, 324 are each configured to accommodate a single large area substrate 210 so that the volume of each chamber may be minimized to enhance fast pumping and vent cycles. In the embodiment depicted in FIG. 3, each substrate transfer chamber 320, 322, 324 has an interior volume of about less than about 2000 liters, and in one example an internal volume of 1000 liters, to accommodate substrates having a plan surface area of about 3.7 square meters. It is contemplated that a substrate transfer chamber of the present invention having other widths, lengths and/or heights may be configured to accommodate different size substrates.

The chamber body 312 includes first sidewall 302, a second sidewall 304, a third sidewall 306, a bottom 308 and a top 310. A fourth sidewall 318 (partially shown in FIG. 3) is opposite the third sidewall 306. The body 312 is fabricated from a rigid material suitable for use under vacuum conditions. The chamber body 312 is fabricated from a single block (e.g., one piece) of aluminum or other suitable material, or fabricated from modular sections.

The substrate 210 is supported by a plurality of substrate supports 344 above the bottom 308 of the first substrate transfer chamber 320 and the interior walls 314 bounding the bottom of the second and third substrate transfer chambers 322, 324. The substrate supports 344 are configured and spaced to support the substrate 210 at an elevation above the bottom 308 (or walls 314) to avoid contact of the substrate with the chamber body 312. The substrate supports 344 are configured to minimize scratching and contamination of the substrate. In the embodiment depicted in FIG. 3, the substrate supports 344 are stainless pins having a rounded upper end 346. Other suitable substrate supports are described in U.S. Pat. No. 6,528,767, filed Mar. 5, 2003; U.S. patent application Ser. No. 09/982,406, filed Oct. 27, 2001; and U.S. Patent Application No. 60/376,857, filed Feb. 27, 2003, all of which are incorporated by reference in their entireties.

At least one of the sidewalls of each of the substrate transfer chambers 320, 322, 324 includes at least one port 340 formed therethrough and coupled to a pumping system 342 to facilitate controlling the pressure within the interior volume of each chamber. The pumping system 342 includes vent, pumps and flow controls that enable the pumping system 342 to selectively vent or pump down a predetermined one of the substrate transfer chambers 320, 322, 324. One example of a pumping system that may be adapted to benefit from the invention is described in the previously incorporated U.S. Provisional Application Ser. No. 60/512,727, entitled "LOAD LOCK CHAMBER FOR LARGE AREA SUBSTRATE PROCESSING SYSTEM", filed Oct. 20, 2003, by Kurita et al.

Each of the substrate transfer chambers 320, 322, 324 defined in the chamber body 312 includes two substrate access ports 316. The ports 316 are configured to facilitate the entry and egress of large area substrates 210 from the load lock chamber 200. In the embodiment depicted in FIG. 3, the substrate access ports 316 of each of the substrate transfer chambers 320, 322, 324 are disposed on opposite sides of the chamber body 312, however, the ports 316 may alternatively be positioned on adjacent walls of the body 312. In one embodiment, the width of the first and second substrate access port 316, 316 are, but not limited to, at least 1365 millimeters.

Each of the substrate access ports 316 are selectively sealed by a respective slit valve door assembly 300 that are adapted to selectively isolate the first substrate transfer chamber 320 from the environments of the transfer chamber 208 and the factory interface 212. Each slit valve door assembly 300 is moved between an open and closed position by at least one actuator 330 (one actuator 330 is normally positioned outside the chamber body 312 on the fourth wall 318 in FIG. 3).

Figure 4:
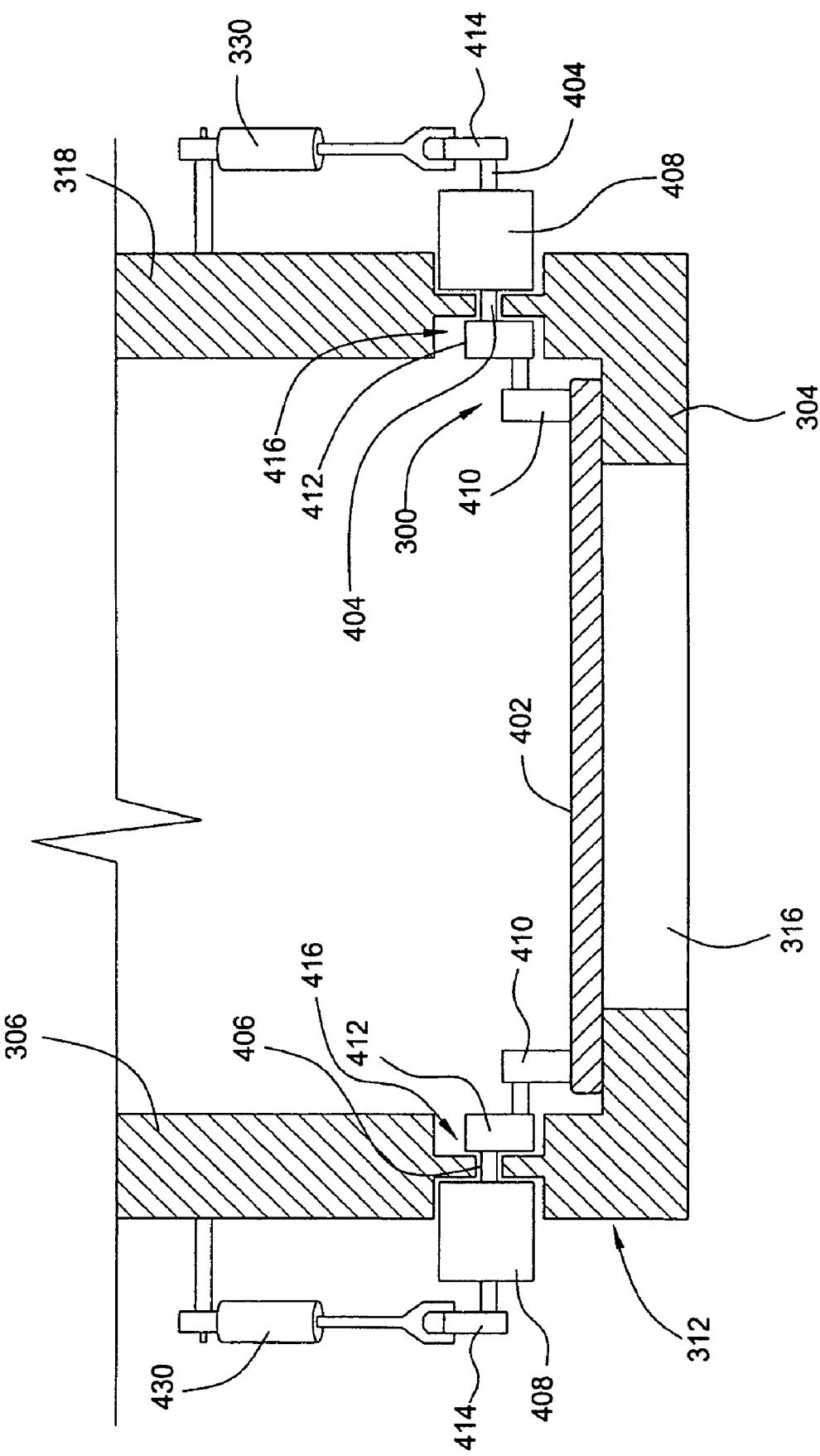
FIG. 4 is a sectional view of the load lock chamber taken along section lines 4-4 of FIG. 3.

FIG. 4 is a horizontal sectional view of the load lock chamber 200 through one of the slit valve door assemblies 300. The slit valve door assembly 300 includes a door member 402 coupled to at least a first shaft 404. The first shaft 404 is rotated by the actuator 330 that moves the door member 402 between the open and closed position. In the embodiment depicted in FIG. 4, the slit valve door assembly 300 includes a second shaft 406 coupled to the door member 402 and to a second actuator 430 shown coupled to the exterior of the third wall 306 of the chamber body 312. The second actuator 430 cooperates with the actuator 330 to rotate the door member 402. The first and second actuators 330, 430 may be a hydraulic cylinder, a pneumatic cylinder, motor or other actuator suitable for rotating the shafts 404, 406.

Each shaft 404, 406 is coupled to a mounting assembly 410 of the door member 402 by an internal actuator arm 412. The sidewalls 306, 318 include a recess 416 formed therein that allows the internal actuator arm 412 to rotate, thereby allowing the width and internal volume of the chamber body 316 to be minimized. Each shaft 404, 406 is also respectively coupled by an external actuator arm 414 to the actuators 330, 430. Each external actuator arm 414 and shaft 404, 406 may be splined, keyed or otherwise configured to prevent rotational slippage therebetween.

Each shaft 404, 406 passes through a seal pack assembly 408 that allows rotation of the shaft while maintaining the vacuum integrity of the chamber body 312. The seal pack assembly 408 is generally mounted to the exterior of the chamber body 312 to minimize the width and internal volume of the chamber body 312.

Figure 5:
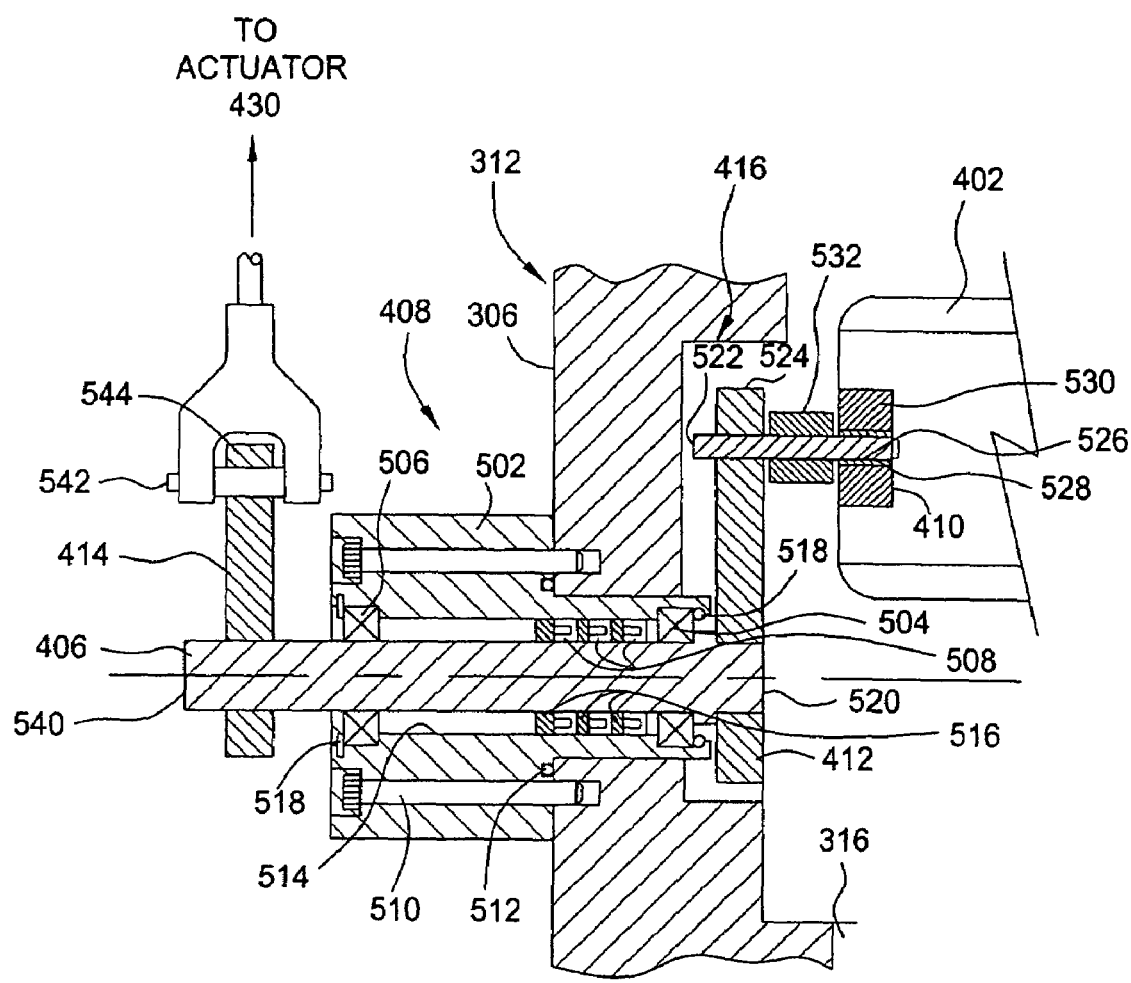
FIG. 5 is a sectional view of one embodiment of a seal pack assembly taken along section lines 5-5 of FIG. 4.

FIG. 5 is a sectional view of one embodiment of the seal pack assembly 408. The seal pack assembly 408 includes a housing 502, an inner bearing 504, an outer bearing 506 and one or more shaft seals 508. The housing 502 is generally coupled to the chamber body 312 by a plurality of fasteners 510. An o-ring 512 is disposed between the housing 502 and chamber body 312 to provide a vacuum seal therebetween.

The housing 502 includes a through-hole 514 that allows the shaft 406 to pass through the housing 502. The hole 514 has counterbores at each end that accept the inner and outer bearings 504, 506. Retaining rings 518 prevent the bearings 504, 506 moving out of the hole 514. The bearings 504, 506 are press fit around the shaft 406 to facilitate rotation. In the embodiment depicted in FIG. 5, the bearings 504, 506 are cross-roller bearings.

The one or more shaft seals 508 are disposed in hole 514 and provide a dynamic vacuum seal between the second shaft 406 and the housing 502. In the embodiment depicted in FIG. 5, a plurality of shaft seals 508 are shown separated by spacers 516.

An inner end 520 of the second shaft 406 is coupled to the internal actuator arm 412 in a manner that ensures transfer of rotational motion from the shaft 406 to the arm 412. For example, the internal actuator arm 412 may be mated with the shaft 406 or include a key to ensure rotation. Alternatively, the internal actuator arm 412 may be clamped, pinned, press-fit, welded or bonded to the shaft 406.

The door member 402 in FIG. 5 has been rotated to best illustrate the connection of a distal end 524 of the internal actuator arm 412 to the mounting assembly 410 by a pin 522. The pin 522 allows the door member 402 to rotate relative to the internal actuator arm 412, thereby allowing the door member 402 to align with the chamber body 312 when sealing the substrate access port 316.

In the embodiment depicted in FIG. 5, the mounting assembly 410 includes a body 530 and spacer 532. The body 530 extends from door member 402 to provide clearance for the pin 522 and the internal actuator arm 412. The spacer 532, which may be an integral part of the body 530, separates and allows clearance for the body 530 and door member 402 to rotate clear of the internal actuator arm 412. In the embodiment depicted in FIG. 5, the pin 522 is fixed to the distal end 524 of internal actuator arm 412 and engages a passage 526 formed in the body 530 of the mounting assembly 410. A bushing 528 is disposed in the passage 526 between the pin 522 and the body 530 to facilitate rotation of the pin 522 within the mounting assembly 410. The bushing 528 may be fabricated from polyamide-imide, such as TORLON®, or other suitable material.

Figure 6:
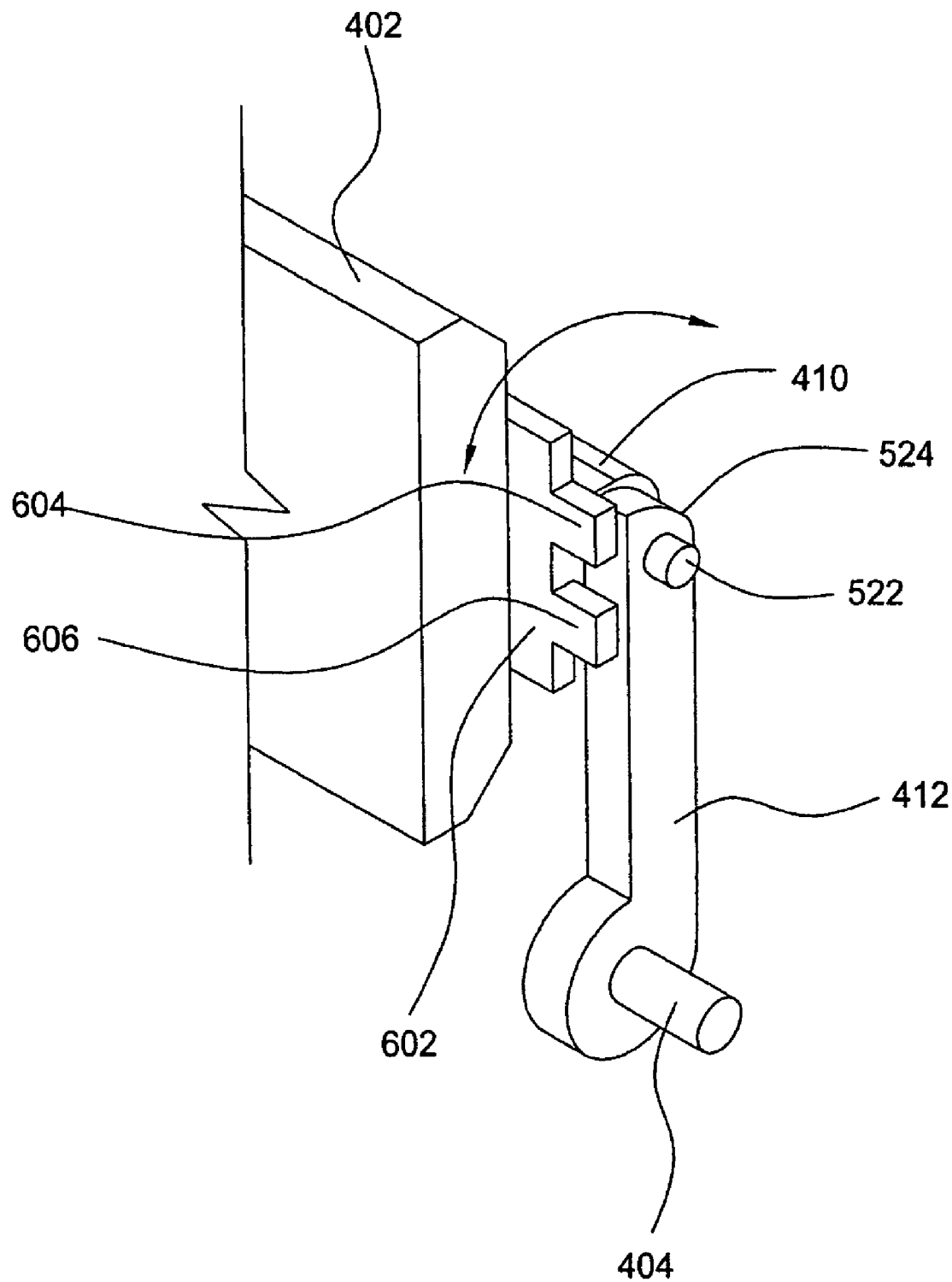
FIG. 6 is a perspective view of one embodiment of a mounting assembly.

FIG. 6 is a perspective view of the mounting assembly 410 having a spring 602. The spring 602 is provided to urge the door member 402 into a predefined orientation relative to the internal actuator arm 412 so that the door member 402 maintains advantageous orientation when contacting the chamber body 312. In the embodiment depicted in FIG. 6, the spring 602 is coupled to the door member 402 and includes two fingers 604, 606. Each finger 604, 606 extends between the door member 402 and internal actuator arm 412, respectively on either side of the pin 522. The fingers 604, 606 operate to urge the door member 402 in opposite directions around the axis of the pin 522, such that the door member 402 returns to the predefined orientation when moved clear of the chamber body 312. The orientation of the door member 402 is typically selected so that the door member 402 is substantially parallel to the chamber body 312 when coming in contact therewith. The first shaft 404 is coupled to the door member 402 in a similar manner.

Figure 7:
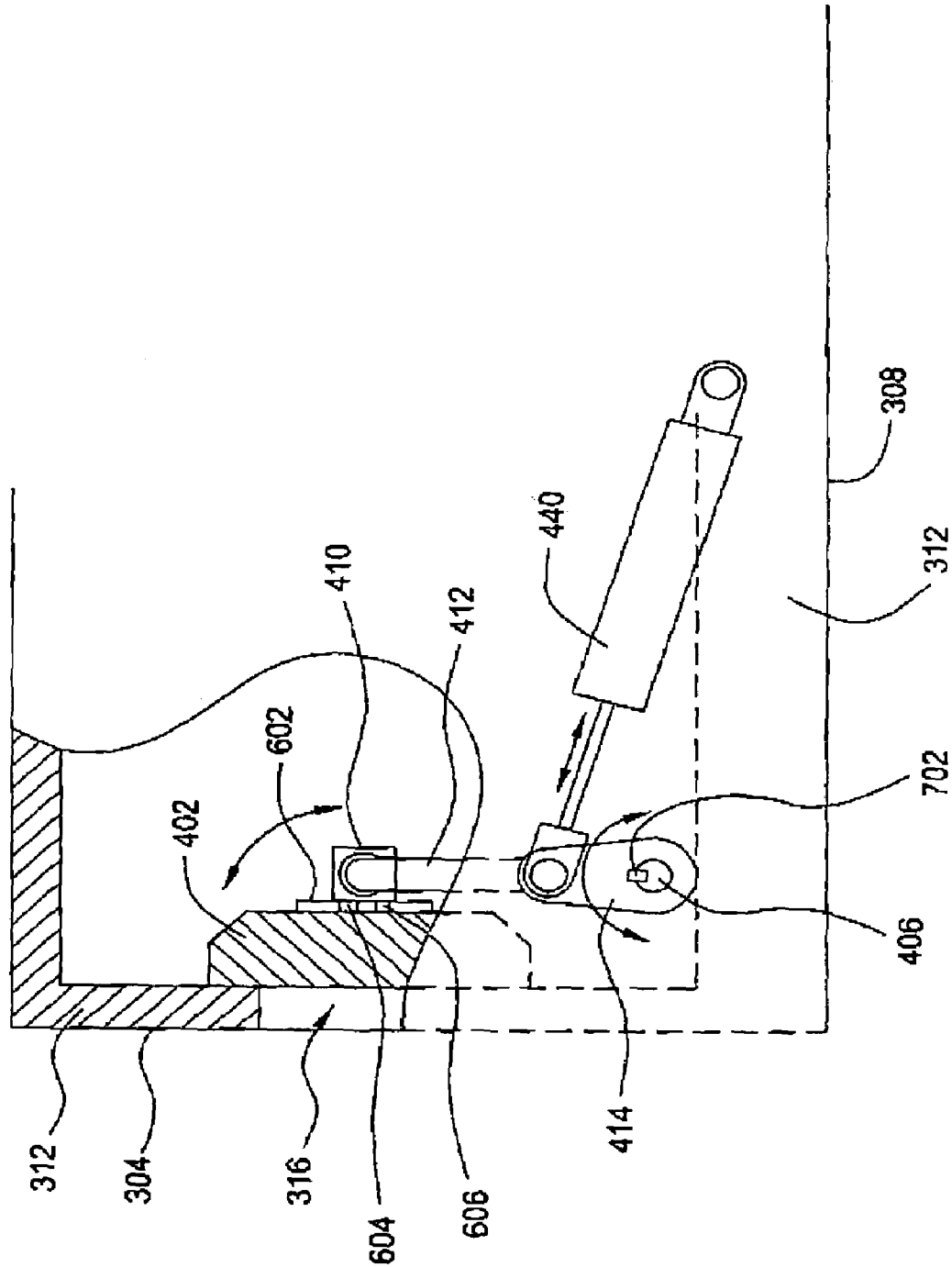
FIG. 7 is a cutaway partial side view of the load lock chamber of FIG. 2.

Referring additionally to FIG. 7, an outer end 540 of the second shaft 406 is coupled to the external actuator arm 414 in a manner that ensures transfer of motion of the external actuator arm 414 as rotational motion to the second shaft 406. For example, the external actuator arm 414 may mate with the shaft 406 or include a key 702 to ensure rotation. Alternatively, the external actuator arm 414 may be clamped, pinned, press-fit, welded or bonded to the shaft 406.

In the embodiments of FIGS. 5 and 7, a pin 542 connects a distal end 544 of the external actuator arm 514 to the actuator 430. The pin 542 allows the linear motion of the actuator 430 to rotatably engage the external actuator arm 514, thereby causing the second shaft 406 (and door member 402) to rotate. The actuator 430 may be a pneumatic or hydraulic cylinder, or other type of suitable linear actuator. It is contemplated that other actuators, including gear motors and other rotary motors/actuator may be alternatively utilized to impart rotational motion to the shaft 406.

Figure 9:
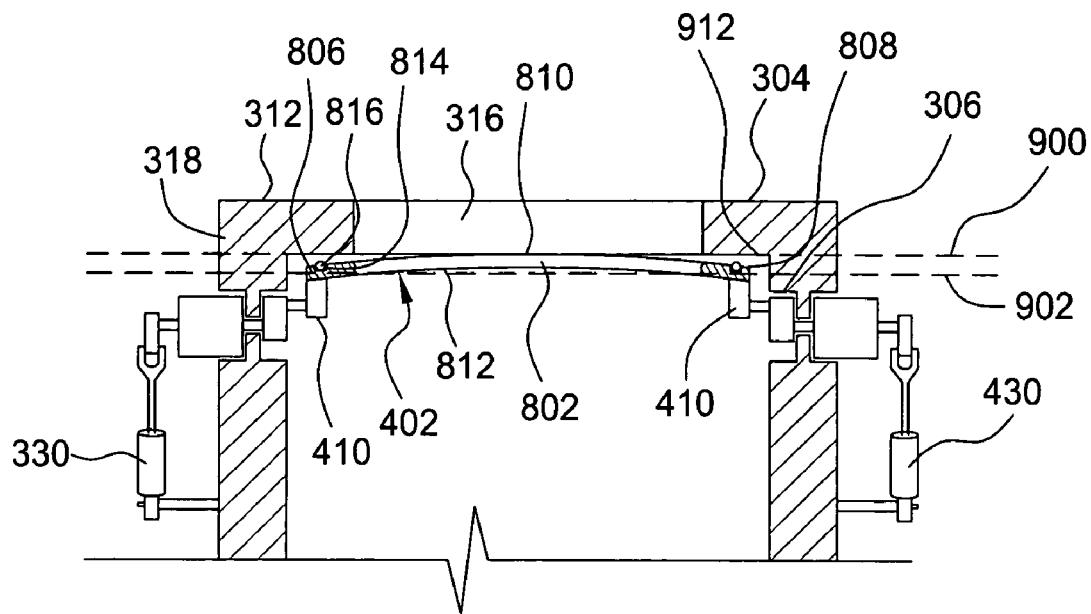
FIGS. 8-9 are front and top views of one embodiment of a door member.
Figure 8:
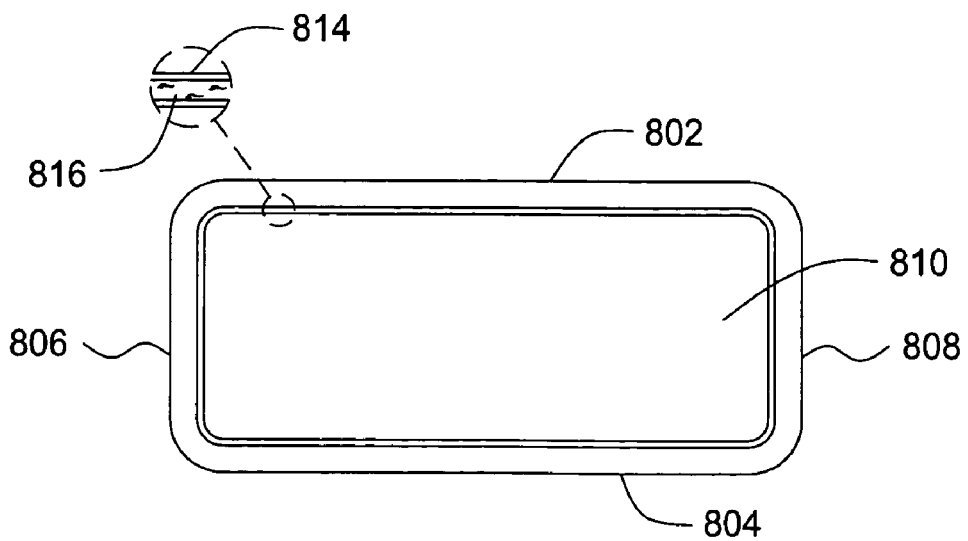

FIGS. 8-9 depict front and top views of one embodiment of the door member 402. The door member 402 is generally elongated, and is fabricated from aluminum or other suitable material. The door member 402 includes major sides 802, 804, minor sides 806, 808, a sealing face 810 and a backside 812. A respective one of mounting assemblies 410 is coupled to opposite ends of the backside 812 of the door member 402, proximate the minor sides 808, 810. In one embodiment, the door member 402 is rectangular and has a width between the minor sides 806, 808 of at least 1260 millimeters. It is contemplated that the door member 402 may be longer or shorter in width to accommodate substrates of different sizes.

A seal gland 814 is formed in the sealing face 810 inward of the sides 802, 804, 806, 808. The seal gland 814 circumscribes the center portion of the door member 402 that covers the substrate access port 316 through the chamber body 312. A seal 816 is disposed in the seal gland 814 and seals the door member 402 to the chamber body 312. The seal 816 is generally configured to prevent contact between the door member 402 to the chamber body 312 when compressed by the actuators 330, 430. In one embodiment, the seal 816 is comprised of an o-ring fabricated from fluoropolymers or other suitable materials. Examples of other seal materials include fluorocarbon (fkm) or perfluoroelastomer (ffkm), nitril rubber (nbr) and silicone. It is contemplated that the seal 816 and seal gland 814 may be alternatively disposed on the chamber body 312.

At least the sealing face 810 of the door member 404 is curved relative to a major axis 902 defined connecting the minor sides 806, 808. The major axis 902 is parallel to an imaginary line 900 defined by a sealing surface 912 of the chamber body 312 to which the door member 402 seals. The axis 902 is also parallel to the shafts 404, 406. The sealing surface 912 and door member 402 are shown in an exaggerated spaced-apart relationship in FIG. 9 for clarity. The imaginary line 900 may also be parallel to the shafts 404, 406 and perpendicular to the minor sides 806, 808. In the embodiment depicted in FIG. 9, the sealing face 810 is convex relative to the line 900, such that the center of the sealing face 810 contacts the chamber body 312 first as the door member 402 is closed, thereby creating a spring force within the door member 402.

Figure 10:
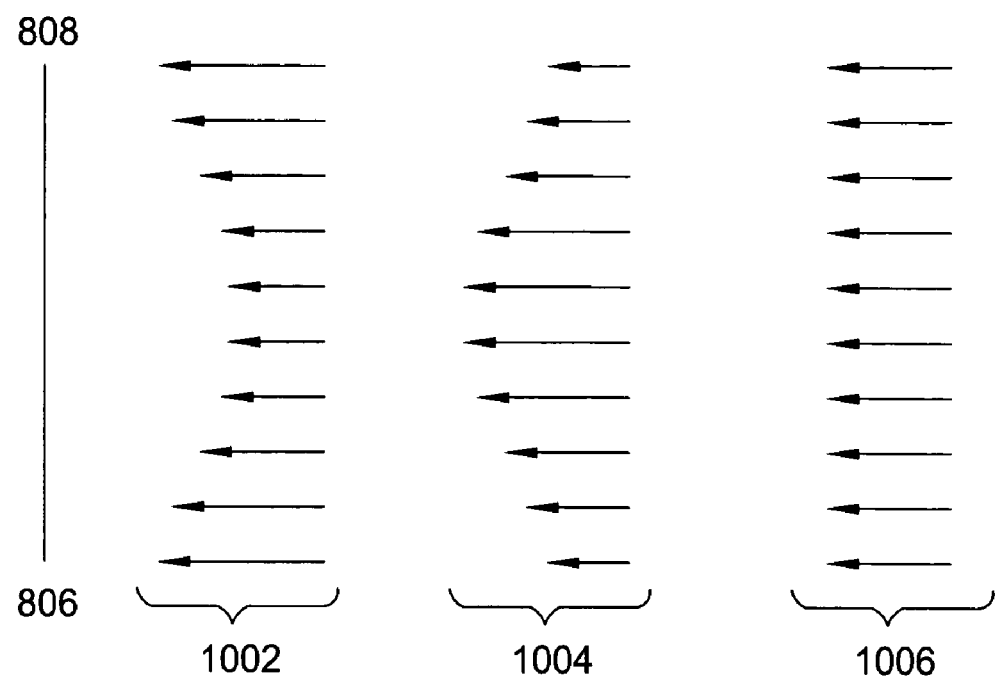
FIG. 10 is a schematic representation of the sealing force on the door member.

In operation, the actuators 330, 430 coupled to mounting assemblies 412 disposed at the minor sides 806, 808 cause the door member 402 to rotate closed. The loading force on the door due to the actuators 330, 430 is depicted by arrows 1002 in FIG. 10. Due to the curvature of the door member 402, the center of the door member 402 contacts the chamber body 312 first. As the force of the actuators 330, 430 cause the door member 402 to flatten, the curvature of the door member 402 generates a spring force that increases the seal 816 in the center regions of the door member 402. The loading force due to the spring force of the door member 402 is depicted by arrows 1004 in FIG. 10. The combination of the high door end loading via the actuators 330, 430 is offset by the center spring force of the door member 402 to uniformly compress and load the seal 816 around the substrate access port 316. The sum of the combined loading forces 910, 920 is depicted by arrows 1006 in FIG. 10. Under the combined forces of the actuators and spring force created by the door member 402, the flattened sealing face 810 provides uniform loading of the seal 816 around the passage through the chamber body 312, thereby ensuring uniform and reliable vacuum seal around the periphery of the passage, while increasing seal longevity. The amount of curvature of the sealing face 810 may be determined by beam deflection analysis for predetermined door geometries and desired vacuum conditions.

Moreover, as the first and second shafts 404, 406 are short relative to the width of the door member 402 and load lock chamber 200, the deflection of the shafts is small, thereby allowing more efficient transfer of force to the door member 402 from the actuators 342. The shorter shafts 404, 406 also allow for smaller shaft diameters to be utilized, thereby reducing costs associated with long shafts requiring greater diameters for stiffness and the associated hardware of larger scale. Additionally, as the internal actuator arms 412 are disposed in recesses 416 formed in the chamber body 316, the width and interior volume of the load lock chamber 200 may be minimized for a predefined substrate access port width, which beneficially reduces the cost of fabricating the load lock chamber 200 and increases throughput by reducing the volume of the load lock chamber 200 required to vent and pump down during operation.

Figure 11:
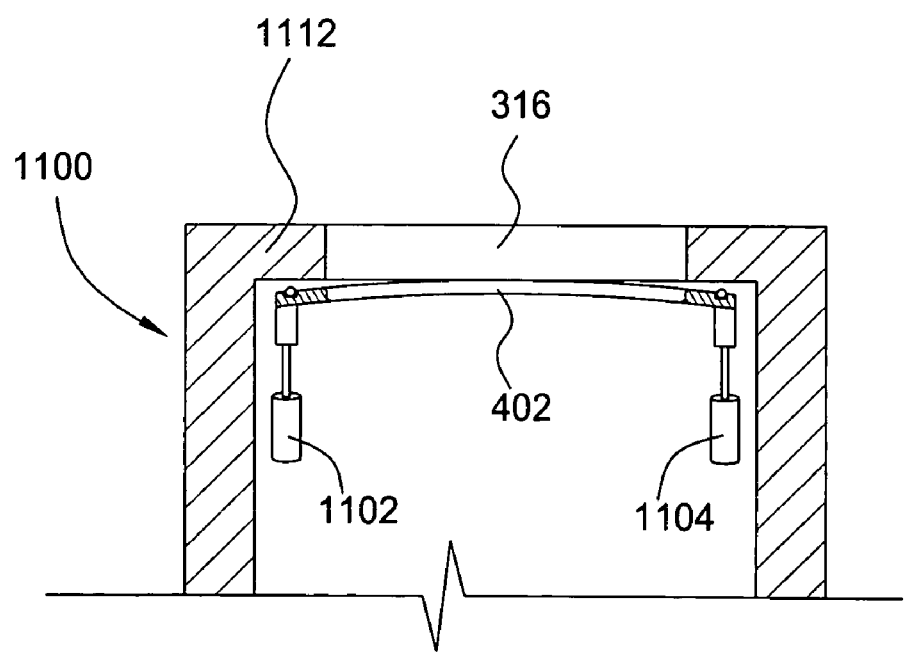
FIG. 11 is a partial sectional view of another embodiment of a load lock chamber.

FIG. 11 is a partial sectional view of another embodiment of a load lock chamber 1100. The load lock chamber 1100 is substantially similar to the load lock chambers described above except wherein the actuators 1102, 1104, coupled to opposite ends of the door member 402 are disposed within the interior of the chamber body 1112.

While the foregoing is directed to the preferred embodiment of the present invention, other and further embodiments of the invention may be devised without departing from the basic scope thereof, and the scope thereof is determined by the claims that follow.

What is claimed is:

1. A vacuum chamber having an apparatus for sealing a substrate transfer passage, comprising:
   a chamber body having a first interior volume;
   a flat sealing surface surrounding a first substrate transfer port defined through the chamber body and configured to allow passage of a large area substrate therethrough; and
   a door member having a convex sealing face relative to the flat sealing surface, wherein the door member is moveable between a first position that covers the first substrate transfer port and a second position clear of the first substrate transfer port.

2. The vacuum chamber of claim 1, wherein the convex sealing face further comprises:
   a seal gland formed in the convex sealing face proximate a peripheral edge of the door member and circumscribing an inner region of the door member.

3. The vacuum chamber of claim 2, further comprising:
   a fluoropolymer seal disposed in the seal gland.

4. The vacuum chamber of claim 1, further comprising:
   a first shaft extending through the chamber body; and
   a second shaft extending through the chamber body, the first and second shafts coupled to opposite ends of a backside of the door member.

5. The vacuum chamber of claim 1, wherein the door member is substantially rectangular and has a width of at least about 1260 millimeters.

6. The vacuum chamber of claim 1, further comprising:
   a second substrate transfer port disposed through the chamber body to the first interior volume.

7. The vacuum chamber of claim 6, further comprising:
   a second interior volume formed in the chamber body vertically stacked above the first interior volume and adapted to accommodate a large area substrate therein;
   a third substrate transfer port disposed through the chamber body to the second interior volume; and a fourth substrate transfer port disposed through the chamber body to the second interior volume.

8. The vacuum chamber of claim 1, further comprising:
a flat sealing surface surrounding a second substrate transfer port disposed through the chamber body to the first interior volume; and
a pressure control system coupled to the chamber body and adapted to control the pressure of the first interior volume of the chamber body.

9. The vacuum chamber of claim 8, wherein the convex sealing face further comprises:
a seal gland formed in the convex sealing face proximate a peripheral edge of the door member and circumscribing an inner region of the door member.

10. The vacuum chamber of claim 9, further comprising:
a fluoropolymer seal disposed in the seal gland.

11. The vacuum chamber of claim 8, further comprising:
a first shaft extending through the chamber body; and
a second shaft extending through the chamber body, the first and second shafts coupled to opposite ends of a backside of the door member.

12. The vacuum chamber of claim 11, further comprising:
a first mounting assembly coupled to the backside of the door member;
a first internal actuator arm coupled the first shaft; and
a first pin rotationally coupling the first mounting assembly to the first internal actuator arm;
a second mounting assembly coupled to the backside of the door member opposite the first mounting assembly;
a second internal actuator arm coupled the second shaft; and
a second pin rotationally coupling the second mounting assembly to the second internal actuator arm.

13. The vacuum chamber of claim 12, wherein the chamber body has
a first recess formed in a first sidewall accommodating at least a portion of the first internal actuator arm, and
a second recess formed in a second sidewall accommodating at least a portion of the second internal actuator arm.

14. The vacuum chamber of claim 12, further comprising:
a first actuator coupled to the first shaft; and
a second actuator coupled to the second shaft, wherein the first and second actuators are adapted to rotate the door member about the first and second shafts.

15. The vacuum chamber of claim 8, further comprising:
a spring coupled to the door member and adapted to urge the door member to a predefined orientation relative to the chamber body when the door member is in the first position.

16. The vacuum chamber of claim 8, wherein a width of the first substrate transfer port is at least about 1365 millimeters.

17. The vacuum chamber of claim 8, further comprising:
a second interior volume disposed in the chamber body vertically stacked above the first interior volume and adapted to accommodate a large area substrate.

18. The vacuum chamber of claim 17, further comprising:
a third substrate access port disposed through the chamber body to the second interior volume; and
a fourth substrate access port disposed through the chamber body to the second interior volume.

19. The vacuum chamber of claim 1, wherein the convex sealing face of the door member is convex relative to a major axis of the door member, and is deformable to a flattened shape when the door member is placed in contact with the flat sealing surface surrounding the first substrate transfer port.

20. The vacuum chamber of claim 1, wherein the door member is substantially rectangular and has a width of at least about 1260 millimeters along a major axis.

21. The vacuum chamber of claim 20, wherein the convex sealing face further comprises:
a seal gland formed in the convex sealing face proximate the major and minor edges of the door member and circumscribing an inner region of the door member.

22. The vacuum chamber of claim 1, wherein the convex sealing face is convex relative to a major axis of the door member.

23. A vacuum chamber having an apparatus for sealing a substrate transfer passage, comprising:
a vacuum chamber body having first interior volume and a flat sealing surface surrounding a first substrate transfer port defined through the chamber body and configured to allow passage of a large area substrate therethrough;
a flexible door member having a convex sealing face movable between a first position that covers the first substrate transfer port and a second position clear of the first substrate transfer port; and
two mounting assemblies coupled to opposite ends of a backside of the flexible door member.

24. The vacuum chamber of claim 23, wherein the convex sealing face further comprises:
a seal gland formed in the convex sealing face proximate a peripheral edge of the door member and circumscribing an inner region of the flexible door member.

25. The vacuum chamber of claim 24, further comprising:
a fluoropolymer seal disposed in the seal gland.

26. The vacuum chamber of claim 23, wherein the flexible door member is substantially rectangular and has a width of at least about 1260 millimeters.

27. The vacuum chamber of claim 23, further comprising:
a second substrate transfer port disposed through the chamber body to the first interior volume.

28. The vacuum chamber of claim 27, further comprising:
a second interior volume formed in the chamber body vertically stacked above the first interior volume and adapted to accommodate a large area substrate therein;
a third substrate transfer port disposed through the chamber body to the second interior volume; and
a fourth substrate transfer port disposed through the chamber body to the second interior volume.

29. A chamber having an apparatus for sealing a substrate transfer passage, comprising:
a chamber body having an interior volume;
at least one substrate transfer port defined through the chamber body and configured to allow passage of a large area substrate therethrough;
a door member having a convex sealing face moveable between a first position that covers the substrate transfer port and a second position clear of the substrate transfer port
a first shaft extending through the chamber body;
a second shaft extending through the chamber body, the first and second shafts coupled to opposite ends of the backside of the door member;
a first mounting assembly coupled to a backside of the door member;
a first internal actuator arm coupled to the first shaft;
a first pin rotationally coupling the first mounting assembly to the first internal actuator arm;
a second mounting assembly coupled to the backside of the door member opposite the first mounting assembly;
a second internal actuator arm coupled the second shaft;

a second pin rotationally coupling the second mounting assembly to the second internal actuator arm;

a first recess formed in a first sidewall accommodating at least a portion of the first internal actuator arm; and a second recess formed in a second sidewall accommodating at least a portion of the second internal actuator arm.

30. A load lock chamber having an apparatus for sealing a substrate transfer passage, comprising:

a chamber body having at least one substrate transfer chamber formed therein;

a first substrate transfer port and a second substrate transfer port disposed through the chamber body to the substrate transfer chamber;

a first door member having a convex sealing face and moveable between a first position that closes the first substrate transfer port and a second position clear of the first substrate transfer port;

a pressure control system coupled to the chamber body and adapted to control the pressure of the interior volume of the substrate transfer chamber;

a first shaft extending through the chamber body;

a second shaft extending through the chamber body, the first and second shafts coupled to opposite ends of the backside of the door member;

a first mounting assembly coupled to a backside of the door member;

a first internal actuator arm coupled the first shaft;

a first pin rotationally coupling the first mounting assembly to the first internal actuator arm;

a second mounting assembly coupled to the backside of the door member opposite the first mounting assembly;

a second internal actuator arm coupled the second shaft;

a second pin rotationally coupling the second mounting assembly to the second internal actuator arm;

a first recess formed in a first sidewall accommodating at least a portion of the first internal actuator arm; and a second recess formed in a second sidewall accommodating at least a portion of the second internal actuator arm.

31. A vacuum chamber having an apparatus for sealing a substrate transfer passage, comprising:

a vacuum chamber body having an interior volume;

a flat sealing surface surrounding a substrate transfer port defined through the chamber body and configured to allow passage of a large area substrate therethrough;

a door member having a convex sealing face relative to the flat sealing surface, wherein the door member is moveable between a first position that covers the substrate transfer port and a second position clear of the substrate transfer port;

a first shaft extending through the chamber body;

a second shaft extending through the chamber body, the first and second shafts coupled to opposite ends of a backside of the door member;

a first mounting assembly coupled to the backside of the door member;

a first internal actuator arm coupled to the first shaft;

a first pin rotationally coupling the first mounting assembly to the first internal actuator arm;

a second mounting assembly coupled to the backside of the door member opposite the first mounting assembly;

a second internal actuator arm coupled the second shaft; and a second pin rotationally coupling the second mounting assembly to the second internal actuator arm.

32. The vacuum chamber of claim 31, wherein the chamber body has a first recess formed in a first sidewall accommodating at least a portion of the first internal actuator arm, and a second recess formed in a second sidewall accommodating at least a portion of the second internal actuator arm.

33. The vacuum chamber of claim 31, further comprising:

a spring coupled to the door member and adapted to urge the door member to a predefined orientation relative to the first internal actuator arm.

34. The vacuum chamber of claim 31, further comprising:

a first actuator coupled to the first shaft; and a second actuator coupled to the second shaft, wherein the first and second actuators are adapted to rotate the door member about the first and second shafts.

\* \* \* \* \*